US007592400B2

(12) United States Patent
Woerner

(10) Patent No.: US 7,592,400 B2
(45) Date of Patent: Sep. 22, 2009

(54) ADDITION-CROSSLINKABLE SILICONE COMPOSITIONS COMPRISING HIGH-VISCOSITY POLYDIORGANOSILOXANES

(75) Inventor: Christof Woerner, Burghausen (DE)

(73) Assignee: Wacker Chemie AG, Munich (DE)

( * ) Notice: Subject to any disclaimer, the term of this patent is extended or adjusted under 35 U.S.C. 154(b) by 438 days.

(21) Appl. No.: 11/429,841

(22) Filed: May 8, 2006

(65) Prior Publication Data

US 2006/0258819 A1  Nov. 16, 2006

(30) Foreign Application Priority Data

May 12, 2005  (DE) ............... 10 2005 022 106

(51) Int. Cl.
*C08L 83/04*  (2006.01)
(52) U.S. Cl. ............... 525/477; 524/492; 524/493; 524/496; 524/588; 525/478; 525/479; 528/15; 528/31; 528/32
(58) Field of Classification Search ............... None
See application file for complete search history.

(56) References Cited

U.S. PATENT DOCUMENTS

| 3,671,480 | A | * | 6/1972 | Wada et al. ............... 523/307 |
| 3,884,866 | A | * | 5/1975 | Jeram et al. ............... 523/203 |
| 4,061,609 | A | | 12/1977 | Bobear |
| 4,539,357 | A | * | 9/1985 | Bobear ............... 524/267 |
| 4,753,978 | A | * | 6/1988 | Jensen ............... 524/862 |
| 4,766,170 | A | * | 8/1988 | Honma et al. ............... 524/500 |
| 5,574,073 | A | | 11/1996 | Juen et al. |
| 5,859,094 | A | | 1/1999 | Conway et al. |
| 5,908,878 | A | * | 6/1999 | Baity et al. ............... 523/203 |
| 6,245,875 | B1 | * | 6/2001 | Wang ............... 528/25 |
| 6,518,371 | B1 | | 2/2003 | Fink et al. |
| 2004/0132947 | A1 | | 7/2004 | Achenbach et al. |
| 2006/0258819 | A1 | | 11/2006 | Woerner |

FOREIGN PATENT DOCUMENTS

| EP | 0 305 073 | | 3/1989 |
| EP | 0 695 787 | | 2/1996 |
| EP | 0 798 342 | A2 | 10/1997 |
| EP | 0 834 534 | | 4/1998 |
| EP | 0 994 159 | | 4/2000 |
| EP | 1 006 147 | | 6/2000 |
| EP | 1 077 226 | | 2/2001 |
| EP | 1361263 | A | 11/2003 |
| WO | WO 02/090437 | * | 11/2002 |

OTHER PUBLICATIONS

English Derwent Abstract AN 2000-401775 [35], corresp. to EP 1 006 147 A1.
English Derwent Abstract AN 2001-283482 [30], corresp. to EP 1 077 226 A1.
English Derwent Abstract AN 2000-319924 [28], corresp. to EP 0 994 159 A1.
English Derwent Abstract AN 1998-160214 [15], corresp. to EP 0 834 534 A1.

* cited by examiner

*Primary Examiner*—Marc S Zimmer
(74) *Attorney, Agent, or Firm*—Brooks Kushman P.C.

(57) ABSTRACT

Addition curable elastomer compositions whose cured products exhibit high elongation at break and high tear propagation resistance are prepared from specific molecular weight ranges of alkenyl-terminal, alkenyl-pendant, and substantially non-functional organopolysiloxanes.

20 Claims, No Drawings

ADDITION-CROSSLINKABLE SILICONE COMPOSITIONS COMPRISING HIGH-VISCOSITY POLYDIORGANOSILOXANES

BACKGROUND OF THE INVENTION

1. Field of the Invention

The invention relates to addition-crosslinkable silicone compositions, to processes for preparing them, to the silicone elastomers obtainable therefrom, and to their production and their use.

2. Background Art

It is known that addition of polydiorganosiloxanes having lateral alkenyl groups to alkenyldiorganosiloxy-terminated polydiorganosiloxanes having a viscosity of up to 200,000 mPas gives addition-crosslinkable liquid silicone rubbers, known as LSR compositions, which, after crosslinking, provide silicone elastomers having improved mechanical properties. This applies particularly to tear propagation resistance in accordance with ASTM D 624 B. To improve the mechanical properties, in particular the tear propagation resistance, polydiorganosiloxanes having terminal and lateral alkenyl groups or low-viscosity alkenyldiorganosiloxy-terminated polydiorganosiloxanes are added to alkenyldiorganosiloxy-terminated polydiorganosiloxanes.

EP 0 305 073 A2 describes the improvement of the mechanical properties, in particular the tear propagation resistance, by addition of a polydiorganosiloxane which bears vinyl groups both at the end of the chain and in the chain and has a viscosity of 100-200,000 mPas, to a vinyl-terminated polydiorganosiloxane having a viscosity of from 20 000 to 200,000 mPas. Silicone elastomers having a tear propagation resistance of about 40 N/mm (ASTM D624) and an elongation at break of a maximum of 580% at a hardness of about 50 Shore A can be obtained from this polymer combination.

EP 0 695 787 A2 describes the improvement of tear propagation resistance by means of a low molecular weight vinyl-terminated polydiorganosiloxane having a viscosity of from 1.0 to <50 mPas. However, the addition of vinyl-terminated polydiorganosiloxanes having such a low viscosity results in a reduction in the elongation at break.

SUMMARY OF THE INVENTION

It is therefore an object of the present invention to provide addition-crosslinkable silicone compositions which crosslink to give silicone elastomers having a high elongation at break and at the same time a high tear propagation resistance. These and other objects are met by providing a curable elastomer composition which includes terminal alkenyl-functional, pendant alkenyl functional, and substantially non-functional polyorganosiloxanes of defined viscosities.

DETAILED DESCRIPTION OF THE PREFERRED EMBODIMENT(S)

The invention thus provides addition-crosslinkable silicone compositions comprising (A) 100 parts by weight of vinyl-terminated polydiorganosiloxane having a viscosity of from 5000 to 1,000,000 mPas, with the polydiorganosiloxane having not more than 0.1 mol % of lateral vinyl groups, (B) from 0.1 to 50 parts by weight of polydiorganosiloxane having a viscosity of from 200 to 1,000,000 mPas, with the polydiorganosiloxane having from 0.5 to 30 mol % of lateral vinyl groups, (C) from 1 to 150 parts by weight of polydiorganosiloxane having a viscosity of at least 2,000,000 mPas, with the polydiorganosiloxane having from no to a maximum of three lateral vinyl groups per polymer chain, (D) SiH-functional crosslinker, (E) hydrosilylation catalyst and (F) 0-90 parts by weight of a filler having a specific surface area of at least 50 m$^2$/g.

The use of the vinyl-terminated polydiorganosiloxane (A) in combination with a polydiorganosiloxane (B) which bears vinyl groups in the chain and optionally also at the end of the chain and the high molecular weight polydiorganosiloxane (C) gives LSR elastomers which have very high elongations at break and tear propagation resistances.

The viscosity of the polydiorganosiloxane (B) is preferably not more than 200%, in particular not more 100%, of the viscosity of the polydiorganosiloxane (A) and the viscosity of the polydiorganosiloxane (C) is preferably at least 500%, in particular at least 800%, of the viscosity of the polydiorganosiloxane (A).

The vinyl-terminated polydiorganosiloxane (A) preferably comprises 2 units of the general formula (1) per molecule

units of the general formula (2)

and displays a viscosity of from 5000 to 1,000,000 mPas, where the radicals R are identical or different monovalent, unsubstituted or halogen- or cyano-substituted, SiC-bonded $C_1$-$C_{18}$-hydrocarbon radicals which are free of aliphatic carbon-carbon multiple bonds, and the radicals R1 are identical or different monovalent, unsubstituted or halogen- or cyano-substituted $C_1$-$C_{10}$ alkenyl groups which may be bound to silicon via a divalent organic group.

The vinyl-terminated polyorganosiloxane (A) preferably has a viscosity of from 7000 to 700,000 mPas, more preferably from 9000 to 600,000 mPas. The vinyl-terminated polyorganosiloxane (A) preferably bears no lateral vinyl groups.

Examples of unsubstituted hydrocarbon radicals R are alkyl radicals such as the methyl, ethyl, n-propyl, isopropyl, n-butyl, isobutyl, tert-butyl, n-pentyl, isopentyl, neopentyl, tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as cyclopentyl, cyclohexyl, 4-ethylcyclohexyl, cycloheptyl radicals, norbornyl radicals and methylcyclohexyl radicals; aryl radicals such as the phenyl, biphenylyl, naphthyl, anthryl and phenanthryl radical; alkaryl radicals such as o-, m-, p-tolyl radicals, xylyl radicals and ethylphenyl radicals; aralkyl radicals, such as the benzyl radical, the α-phenylethyl radical and the β-phenylethyl radical, and also the fluorenyl radical.

Examples of substituted hydrocarbon radicals as radicals R are halogenated hydrocarbon radicals such as the chloromethyl, 3-chloropropyl, 3-bromopropyl, 3,3,3-trifluoropropyl and 5,5,5,4,4,3,3-heptafluoropentyl radicals and also the chlorophenyl, dichlorophenyl and trifluorotolyl radicals.

The hydrocarbon radical R is preferably an unsubstituted or substituted $C_1$-$C_6$-alkyl radical or the phenyl radical, in particular the methyl or phenyl radical.

The alkenyl groups $R^1$ are able to undergo an addition reaction with the SiH-functional crosslinker (D). Alkenyl groups having from 2 to 6 carbon atoms, e.g. vinyl, allyl, methallyl, 1-propenyl, 5-hexenyl, ethynyl, butadienyl, hexadienyl, cyclopentenyl, cyclopentadienyl, cyclohexenyl, preferably vinyl and allyl, are usually used.

Divalent organic groups via which the alkenyl groups $R^1$ may be bound to silicon of the polymer chain comprise, for example, oxyalkylene units such as those of the general formula (3)

$$-(O)_m[(CH_2)_nO]_o-\qquad(3),$$

where m is 0 or 1, in particular 0, n is from 1 to 4, in particular 1 or 2, and o is from 1 to 20, in particular from 1 to 5.

The oxyalkylene units of the general formula (3) are bound at the left-hand end to a silicon atom.

The vinyl-containing polydiorganosiloxane (B) preferably comprises units of the general formula (2), from 0.5 to 30 mol % of units of the general formula (4)

$$[RR^1SiO_{2/2}]\qquad(4),\text{ and}$$

0, 1 or 2 units of the general formula (1) or 2, 1 or 0 units of the general formula (5) per molecule $$[R_3SiO_{1/2}]\qquad(5),$$

and has a viscosity of from 200 to 1,000,000 mPas, where R and $R^1$ are as defined above.

The vinyl-containing polydiorganosiloxane (B) preferably has a viscosity of from 500 to 100,000 mPas, more preferably from 1000 to 50,000 mPas.

The polydiorganosiloxane (C) preferably comprises: 0, 1 or 2 units of the formula (1) or 2, 1 or 0 units of the formula (5) per molecule, units of the formula (2) and 0, 1 , 2 or 3 units of the formula (4) per molecule and has a viscosity of at least 2,000,000 mPas.

The polydiorganosiloxane (C) preferably has a viscosity of from 3,000,000 to 40,000,000 mPas, more preferably from 4,000,000 to 35,000,000 mPas, preferably has no lateral vinyl groups in the polymer chain, and preferably has an Si-bonded OH content of not more than 100 ppm by weight. The OH content is more preferably<50 ppm by weight.

The SiH-functional crosslinker (D) is preferably an organosilicon compound or a mixture of at least 2 organosilicon compounds which have at least two, preferably at least three hydrogen atoms bound to silicon, per molecule. The crosslinker (D) is preferably used in such an amount that the ratio of its silicon-bonded hydrogen atoms to the sum of the carbon-carbon multiple bonds of the polyorganosiloxanes (A)+(B)+(C)+carbon-carbon multiple bonds of the fillers (F) is at least 1.1:1.

The SiH crosslinker (D), which comprises an organosilicon compound containing at least two, preferably at least three SiH functions per molecule, preferably comprises units of the average general formula (6)

$$H_aR^3_bSiO_{(4-a-b)/2}\qquad(6),$$

where the radicals $R^3$ are each, independently of one another, a monovalent, unsubstituted or halogen- or cyano-substituted, SiC-bonded $C_1$-$Cl_{10}$-hydrocarbon radical which is free of aliphatic carbon-carbon multiple bonds, a is 0, 1, 2 or 3, b is 0, 1, 2 or 3 and the sum a+b is<3, with the proviso that at least two silicon-bonded hydrogen atoms are present per molecule.

Examples of unsubstituted radicals $R^3$ are alkyl radicals such as the methyl, ethyl, n-propyl, isopropyl, n-butyl, isobutyl, tert-butyl, n-pentyl, isopentyl, neopentyl, tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical; cycloalkyl radicals such as cyclopentyl, cyclohexyl, 4-ethylcyclohexyl, cycloheptyl radicals, norbornyl radicals and methylcyclohexyl radicals; aryl radicals such as the phenyl, biphenylyl, naphthyl radicals; alkaryl radicals such as o-, m-, p-tolyl radicals and ethylphenyl radicals; aralkyl radicals such as the benzyl radical, the α-phenylethyl radical and the β-phenylethyl radical.

Examples of substituted hydrocarbon radicals as radicals $R^3$ are halogenated hydrocarbons such as the chloromethyl, 3-chloropropyl, 3-bromopropyl, 3,3,3-trifluoropropyl and 5,5,5,4,4,3,3-hexafluoropentyl radicals and the chlorophenyl, dichlorophenyl and trifluorotolyl radicals.

$R^3$ preferably has from 1 to 6 carbon atoms. Particular preference is given to methyl, 3,3,3-trifluoropropyl and phenyl.

Preference is given to using an organosilicon compound (D) containing three or more SiH bonds per molecule. The hydrogen content of organosilicon compound (D), which relates exclusively to the hydrogen atoms bound directly to silicon atoms, is preferably in the range from 0.002 to 1.7% by weight of hydrogen, more preferably from 0.1 to 1.7% by weight of hydrogen. The organosilicon compound (D) preferably has at least three and not more than 600 silicon atoms per molecule. Particular preference is given to using organosilicon compounds (D) which have from 4 to 200 silicon atoms per molecule. The structure of the organosilicon compound (D) can be linear, branched, cyclic or network-like.

Particularly preferred organosilicon compounds (D) are linear polyorganosiloxanes of the average general formula (7)

$$(R^4_3SiO_{1/2})_d(HR^4SiO_{2/2})_e(R^4_2SiO_{2/2})_f\qquad(7),$$

where $R^4$ has the meanings of $R^3$ and d, e, f are nonnegative integers, with the proviso that the relationships d=2, e>2, 5<(e+f)<200 and 0.1<e/(e+f)<1 are fulfilled.

The SiH-functional crosslinker (D) is preferably present in the crosslinkable silicone composition in such an amount that the molar ratio of SiH groups to carbon-carbon multiple bonds is at least 1.1:1, preferably 1.1-5:1, and more preferably 1.1-3:1.

As hydrosilylation catalyst (E), it is possible to use any catalysts which catalyzes the hydrosilylation reactions occurring in the crosslinking of addition-crosslinking silicone compositions. Particularly preferred hydrosilylation catalysts (E) are metals and compounds thereof from the group consisting of platinum, rhodium, palladium, ruthenium and iridium.

Preference is given to using platinum and platinum compounds. Particular preference is given to platinum compounds which are soluble in polyorganosiloxanes. As soluble platinum compounds, it is possible to use, for example, the platinum-olefin complexes of the formulae $(PtCl_2.olefin)_2$ and $H(PtCl_3.olefin)$, with preference being given to using alkenes having from 2 to 8 carbon atoms, e.g. ethylene, propylene, isomers of butene and octene, or cycloalkenes having from 5 to 7 carbon atoms, e.g. cyclopentene, cyclohexene and cycloheptene. Further soluble platinum catalysts are the cyclopropane complex of the formula $(PtCl_2C_3H_6)_2$, the reaction products of hexachloroplatinic acid with alcohols, ethers and aldehydes or mixtures of these, or the reaction product of hexachloroplatinic acid with methylvinylcyclotetrasiloxane in the presence of sodium bicarbonate in ethanolic solution. Particular preference is given to complexes of platinum with vinylsiloxanes, e.g. sym-divinyltetramethyldisiloxane. The platinum compounds described in EP 1 077 226 A1 and EP 0 994 159 A1 are likewise very suitable, and the relevant disclosure of these two patent applications is incorporated by reference into the present patent application.

The hydrosilylation catalyst (E) can be used in any desired form, for example in the form of microcapsules containing hydrosilylation catalyst or polyorganosiloxane particles as described in EP 1 006 147 A1, whose relevant disclosure is incorporated by reference into the present application.

The content of hydrosilylation catalysts (E) is selected so that the addition-crosslinkable silicone composition has a Pt content of from 0.1 to 200 ppm, preferably from 0.5 to 40 ppm.

The reinforcing filler (F) is selected from the group consisting of precipitated and pyrogenic silicas and carbon black. Preference is given to precipitated and pyrogenic silicas and mixtures thereof. Particular preference is given to pyrogenic silicas whose surface has been treated with silylating agents. The hydrophobicization of the silica can be carried out either before incorporation into the polyorganosiloxane or in the presence of a polyorganosiloxane by the in-situ method. Both methods can be carried out either batchwise or continuously. As silylating agents, it is possible to use all the hydrophobicizing agents known to those skilled in the art. These are preferably silazanes, in particular hexamethyldisilazane and/or 1,3-divinyl-1,1,3,3-tetramethyldisilazane, and/or polysilazanes, with water also being able to be additionally used. In addition, other silylating agents such as SiOH— and/or SiCl— and/or alkoxy-functional silanes or siloxanes can also be used as hydrophobicizing agents. Cyclic, linear or branched nonfunctional organosiloxanes such as octamethylcyclotetrasiloxane or polydimethylsiloxane, in each case alone or in addition to silazanes, can likewise be used as silylating agents. To accelerate the hydrophobicization, it is also possible to add catalytically active additives such as hydroxides. The hydrophobicization can be carried out in one step using one or more hydrophobicizing agents or else in a plurality of steps using one or more hydrophobicizing agents.

Preference is given to precipitated or pyrogenic silicas. Particular preference is given to a silica having a specific surface area determined by the BET method of 80-400 $m^2/g$, most preferably 100-400 $m^2/g$.

Particular preference is given to a content of filler (F) of 5-40% by weight, based on (A)+(B)+(C)+(D).

The silicone compositions can, if desired, contain customary additives in a proportion of from 0 to 70% by weight, preferably from 0.0001 to 40% by weight, as further constituent (G). These additives can be, for example, resin-like polyorganosiloxanes which are different from the polyorganosiloxanes (A), (B) and (C), dispersants, solvents, bonding agents, pigments, dyes, plasticizers, organic polymers, heat stabilizers, inhibitors, etc. These include additives such as dyes, pigments, etc. Furthermore, constituents which make the composition thixotropic, e.g. finely divided silica or other commercial additives to induce thixotropy, can also be present as constituents.

Further additives which serve to set the processing time, the crosslinking start temperature and crosslinking rate of the crosslinking compositions in a targeted manner can also be present. These inhibitors and stabilizers are very well known in the field of crosslinking compositions.

In addition, it is also possible to add additives such as the sulfur compounds described in EP 0 834 534 A1, whose relevant disclosure is incorporated by reference into the present patent application, which improve the compression set. In addition, hollow bodies or expandable hollow bodies can also be added. In addition, blowing agents for producing foams can also be added.

The present invention further provides a process for preparing the addition-crosslinkable silicone compositions of the invention, a process for producing the crosslinked silicone elastomers from the addition-crosslinkable silicone compositions of the invention by addition-crosslinking and also the silicone elastomer moldings which can be obtained in this way.

The preparation or compounding of the silicone compositions is carried out by mixing the polyorganosiloxanes (A), (B), (C) and filler (F). Crosslinking is effected after addition of crosslinker (D) and hydrosilylation catalyst (E), preferably by heating, preferably at from 30 to 250° C., more preferably at at least 50° C., in particular at at least 100° C., and most preferably at 150-210° C.

As energy sources for crosslinking by heating, preference is given to using ovens, for example convection drying ovens, heating channels, heated rollers, heated plates or thermal radiation in the infrared region.

The compositions of the invention are suitable for producing addition-crosslinking RTV and LSR compositions, with the first component preferably comprising the hydrosilylation catalyst (E) in addition to (A), (B), (C) and (F) and the second component comprising the SiH crosslinker (D) in addition to (A), (B), (C) and (F).

The moldings are preferably produced from the LSR compositions of the invention by injection molding. For example, pacifiers or seals which have a particularly high tear propagation resistance can be obtained in this way from the addition-crosslinkable silicone compositions of the invention.

EXAMPLES

The following examples describe the way in which the present invention can be performed in principle, without the invention being restricted to the disclosure of the examples.

Example 1

Preparation of Base Composition 750 g of a vinyldimethylsiloxy-terminated polydimethylsiloxane having a viscosity of 20,000 mPas (25° C.) were placed in a laboratory kneader, heated to 150° C. and admixed with 550 g of a hydrophobic pyrogenic silica having a specific surface area determined by the BET method of 300 $m^2/g$ and a carbon content of 3.9% by weight. This gave a highly viscous composition which was subsequently diluted with 220 g of a vinyldimethylsiloxy-terminated polydimethylsiloxane having a viscosity of 20,000 mPas (25° C.). Volatile constituents were removed at 150° C. by kneading under reduced pressure (10 mbar) for one hour.

Example C2

Comparative: Not According to the Invention 560 g of the base composition prepared in example 1 were mixed at a temperature of 25° C. with 140 g of a vinyldimethylsiloxy-terminated polydimethylsiloxane having a viscosity of 20,000 mPas (25° C.), 0.50 g of ethynylcyclohexanol, 11.4 g of a copolymer comprising dimethylsiloxy, methylhydrogensiloxy and trimethylsiloxy units and having a viscosity of 100 mPas at 25° C. and an SiH content of 0.48% and 0.48 g of a solution containing a platinum-sym-divinyltetramethyldisiloxane complex in an amount corresponding to 1% by weight of Pt, based on the solution, on a roll mill. The silicone composition prepared in this way was subsequently crosslinked at a temperature of 170° C. in a hydraulic press for 10 minutes. The about 2 or 6 mm thick silicone elastomer films taken from the mold were heated at 200° C. in a convection oven for 4 hours.

Example C3

Not According to the Invention 560 g of the base composition prepared in Example 1 were mixed at a temperature of 25° C. with 105 g of a vinyldimethylsiloxy-terminated polydimethylsiloxane having a viscosity of 20,000 mpas (25° C.), 35 g of a trimethylsiloxy-terminated polydimethylsiloxane having 2.1 mol % of vinylmethylsiloxy units in the chain and a viscosity of 20,000 mPas (25° C.), 0.50 g of ethynylcyclohexanol, 11.4 g of a copolymer comprising dimethylsiloxy, methylhydrogensiloxy and trimethylsiloxy units and having a viscosity of 100 mPas at 25° C. and an SiH content of 0.48% and 0.48 g of a solution containing a platinum-sym-divinyltetramethyldisiloxane complex in an amount corresponding to 1% by weight of Pt, based on the solution, on a roll mill. Crosslinking of the addition-crosslinking composition was carried out as described in Example 2.

Example C4

Not According to the Invention

As described in Example 2, but using a trimethylsiloxy-terminated polydimethylsiloxane having a viscosity of 20,000,000 mPas (25° C.) in place of the vinyldimethylsiloxy-terminated polydimethylsiloxane having a viscosity of 20,000 mPas (25° C.) used in Example 2. The remaining constituents of the silicone composition and the further processing remained unaltered.

Example C5

Not According to the Invention

As described in Example 2, but using a vinyldimethylsiloxy-terminated polydimethylsiloxane having a viscosity of 20,000,000 mPas (25° C.) in place of the vinyldimethylsiloxy-terminated polydimethylsiloxane having a viscosity of 20,000 mPas (25° C.) used in Example 2. The remaining constituents of the silicone composition and the further processing remained unaltered.

Example C6

Not According to the Invention

As described in Example 2, but using a trimethylsiloxy-terminated polydimethylsiloxane having a viscosity of 30,000 mPas (25° C.) in place of the vinyldimethylsiloxy-terminated polydimethylsiloxane having a viscosity of 20,000 mPas (25° C.) used in example 2. The remaining constituents of the silicone composition and the further processing remained unaltered.

Example C7

Not According to the Invention

As described in Example 3, but using a trimethylsiloxy-terminated polydimethylsiloxane having a viscosity of 30,000 mPas (25° C.) in place of the vinyldimethylsiloxy-terminated polydimethylsiloxane having a viscosity of 20,000 mPas (25° C.) used in Example 3. The remaining constituents of the silicone composition and the further processing remained unaltered.

Example C8

Not According to the Invention

As described in Example 3, but using a vinyldimethylsiloxy-terminated polydimethylsiloxane bearing five lateral vinyl groups and having a viscosity of 20,000,000 mPas (25° C.) in place of the vinyldimethylsiloxy-terminated polydimethylsiloxane having a viscosity of 20,000 mPas (25° C.) used in Example 3. The remaining constituents of the silicone composition and the further processing remained unaltered.

Example 9

As described in Example 3, but using a vinyldimethylsiloxy-terminated polydimethylsiloxane having a viscosity of 20,000,000 mPas (25° C.) in place of the vinyldimethylsiloxy-terminated polydimethylsiloxane having a viscosity of 20,000 mPas (25° C.) used in Example 3. The remaining constituents of the silicone composition and the further processing remained unaltered.

Example 10

As described in Example 3, but using a trimethylsiloxy-terminated polydimethylsiloxane having a viscosity of 20,000,000 mPas (25° C.) in place of the vinyldimethylsiloxy-terminated polydimethylsiloxane having a viscosity of 20,000 mPas (25° C.) used in Example 3. The remaining constituents of the silicone composition and the further processing remained unaltered.

The influence of the viscosity of a high-viscosity vinyldimethylsiloxy- or trimethylsiloxy-terminated polydimethylsiloxane and a polydiorganosiloxane having lateral alkenyl groups on the mechanical properties of LSR elastomers is shown in Table 1.

TABLE 1

|  | Viscosity of uncrosslinked LSR composition [mPas] | Hardness [Shore A] | Tear propagation resistance (ASTM D624) [N/mm] | Ultimate tensile strength [N/mm$^2$] | Elongation at break [%] |
|---|---|---|---|---|---|
| Example C2 | 950000 | 31 | 25 | 9.1 | 590 |
| Example C3 | 930000 | 32 | 32 | 9.1 | 540 |
| Example C4 | 1950000 | 28 | 28 | 8.7 | 750 |
| Example C5 | 2010000 | 30 | 26 | 9.2 | 720 |
| Example C6 | 970000 | 30 | 26 | 8.5 | 610 |
| Example C7 | 950000 | 31 | 31 | 8.4 | 560 |
| Example C8 | 1900000 | 30 | 36 | 8.8 | 580 |
| Example 9 | 1890000 | 32 | 39 | 9.3 | 710 |
| Example 10 | 1870000 | 30 | 40 | 8.9 | 740 |

It can be seen from Table 1 that the use of a high-viscosity polydiorganosiloxane having a viscosity of 20,000,000 mPas and no or only few vinyl groups in combination with a vinyl-rich, low-viscosity polydiorganosiloxane gives LSR elastomers which have very high elongations at break and tear propagation resistances.

Example 11

Preparation of Base Composition 750 g of a vinyldimethylsiloxy-terminated polydimethylsiloxane having a viscosity of 300,000 mPas (25° C.) were placed in a laboratory kneader and mixed with 121 g of hexamethyldisilazane and 6 g of 1,3-divinyltetramethyldisilazane and 127 g of water, subsequently mixed with 522 g of pyrogenic silica having a specific surface area determined by the BET method of 300 m$^2$/g, heated to 100° C. and subsequently kneaded for 1 hour. Volatile constituents were then removed at 150° C. under reduced pressure over a period of 2 hours and the composition was subsequently diluted with 220 g of a vinyldimethylsiloxy-terminated polydimethylsiloxane having a viscosity of 20,000 mPas (25° C.).

Example C12

Not According to the Invention 560 g of the base composition prepared in Example 11 were mixed at a temperature of 25° C. with 140 g of a vinyldimethylsiloxy-terminated polydimethylsiloxane having a viscosity of 20,000 mPas (25° C.), 0.50 g of ethynylcyclohexanol, 17.9 g of a copolymer comprising dimethylsiloxy, methylhydrogensiloxy and trimethylsiloxy units and having a viscosity of 100 mPas at 25° C. and an SiH content of 0.48% and 0.48 g of a solution containing a platinum-sym-divinyltetramethyldisiloxane complex in an amount corresponding to 1% by weight of Pt, based on the solution, on a roll mill. Crosslinking of the addition-crosslinking composition was carried out as described in Example 2.

Example C13

Not According to the Invention 560 g of the base composition prepared in Example 11 were mixed at a temperature of 25° C. with 95 g of a vinyldimethylsiloxy-terminated polydimethylsiloxane having a viscosity of 20,000 mPas (25° C.), 45 g of a vinyldimethylsiloxy-terminated polydimethylsiloxane having 6.2 mol % of vinylmethylsiloxy units in the chain and a viscosity of 3000 mPas (25° C.), 0.50 g of ethynylcyclohexanol, 17.9 g of a copolymer comprising dimethylsiloxy, methylhydrogensiloxy and trimethylsiloxy units and having a viscosity of 100 mPas at 25° C. and an SiH content of 0.48% and 0.48 g of a solution containing a platinum-sym-divinyltetramethyldisiloxane complex in an amount corresponding to 1% by weight of Pt, based on the solution, on a roll mill. Crosslinking of the addition-crosslinking composition was carried out as described in Example 2.

Example C14

Not According to the Invention

As described in Example 12, but using a trimethylsiloxy-terminated polydimethylsiloxane having a viscosity of 20,000,000 mPas (25° C.) in place of the vinyldimethylsiloxy-terminated polydimethylsiloxane having a viscosity of 20,000 mPas (25° C.) used in Example 12. The remaining constituents of the silicone composition and the further processing remained unaltered.

Example C15

Not According to the Invention

As described in Example 12, but using a vinyldimethylsiloxy-terminated polydimethylsiloxane having a viscosity of 20,000,000 mPas (25° C.) in place of the vinyldimethylsiloxy-terminated polydimethylsiloxane having a viscosity of 20,000 mPas (25° C.) used in Example 12. The remaining constituents of the silicone composition and the further processing remained unaltered.

Example C16

Not According to the Invention

As described in Example 12, but using a trimethylsiloxy-terminated polydimethylsiloxane having a viscosity of 30,000 mPas (25° C.) in place of the vinyldimethylsiloxy-terminated polydimethylsiloxane having a viscosity of 20,000 mPas (25° C.) used in Example 12. The remaining constituents of the silicone composition and the further processing remained unaltered.

Example C17

Not According to the Invention

As described in Example 13, but using a trimethylsiloxy-terminated polydimethylsiloxane having a viscosity of 30,000 mPas (25° C.) in place of the vinyldimethylsiloxy-terminated polydimethylsiloxane having a viscosity of 20,000 mPas (25° C.) used in Example 13. The remaining constituents of the silicone composition and the further processing remained unaltered.

Example C18

Not According to the Invention

As described in Example 13, but using a vinyldimethylsiloxy-terminated polydimethylsiloxane bearing five lateral vinyl groups and having a viscosity of 20,000,000 mPas (25° C.) in place of the vinyldimethylsiloxy-terminated polydimethylsiloxane having a viscosity of 20,000 mPas (25° C.) used in Example 13. The remaining constituents of the silicone composition and the further processing remained unaltered.

Example 19

As described in Example 13, but using a vinyldimethylsiloxy-terminated polydimethylsiloxane having a viscosity of 20,000,000 mpas (25° C.) in place of the vinyldimethylsiloxy-terminated polydimethylsiloxane having a viscosity of 20,000 mPas (25° C.) used in Example 13. The remaining constituents of the silicone composition and the further processing remained unaltered.

Example 20

As described in Example 13, but using a trimethylsiloxy-terminated polydimethylsiloxane having a viscosity of 20,000,000 mpas (25° C.) in place of the vinyldimethylsiloxy-terminated polydimethylsiloxane having a viscosity of 20,000 mPas (25° C.) used in Example 13. The remaining constituents of the silicone composition and the further processing remained unaltered.

The influence of the viscosity of a high-viscosity vinyldimethylsiloxy- or trimethylsiloxy-terminated polydimethylsiloxane and a polydiorganosiloxane having lateral alkenyl groups on the mechanical properties of LSR elastomers is shown in Table 2.

It can be seen from Table 2 that the use of a high-viscosity polydiorganosiloxane having a viscosity of 20,000,000 mPas and no or only few vinyl groups in combination with a vinyl-rich, low-viscosity polydiorganosiloxane gives LSR elastomers which have very high elongations at break and tear propagation resistances.

Example 21

560 g of the base composition prepared in Example 1 were mixed at a temperature of 25° C. with 140 g of a trimethylsiloxy-terminated polydimethylsiloxane having a high proportion of residual hydroxydimethylsiloxy end groups of 150 ppm by weight of OH, based on the polydimethylsiloxane used, and a viscosity of 20,000,000 mPas (25° C.) and 11.4 g of a copolymer comprising dimethylsiloxy, methylhydrogensiloxy and trimethylsiloxy units and having a viscosity of 100 mPas at 25° C. and an SiH content of 0.48% on a roll mill.

Example 22

As described in Example 21, but using a trimethylsiloxy-terminated polydimethylsiloxane having a low proportion of residual hydroxydimethylsiloxy end groups of 3 ppm by weight of OH, based on the polydimethylsiloxane used, and a viscosity of 20,000,000 mPas (25° C.) in place of the trimethylsiloxy-terminated polydimethylsiloxane used in Example 21.

Table 3 shows the influence of the OH content of the high-viscosity polydiorganosiloxane on the storage stability.

TABLE 3

|  | OH content of the trimethylsiloxy-terminated-polydimethylsiloxane [ppm] | Initial viscosity of the silicone composition [Pa * s] | Viscosity of the silicone composition after 4 weeks at 25° C. [Pa * s] |
|---|---|---|---|
| Example 21 | 150 | 2830 | 7830 |
| Example 22 | 3 | 2530 | 2590 |

It can be seen from table 3 that a low OH content of the high-viscosity polydiorganosiloxane considerably improves the storage stability.

The characterization of the silicone elastomer properties in Examples 2-10 and 12-20 was carried out in accordance with DIN 53505 for Shore A, DIN 53504-S1 for ultimate tensile

TABLE 2

|  | Viscosity of uncrosslinked LSR composition [mPas] | Hardness [Shore A] | Tear propagation resistance (ASTM D624) [N/mm] | Ultimate tensile strength [N/mm$^2$] | Elongation at break [%] |
|---|---|---|---|---|---|
| Example C12 | 1,730,000 | 51 | 26 | 9.7 | 520 |
| Example C13 | 1650000 | 53 | 39 | 9.8 | 470 |
| Example C14 | 2600000 | 48 | 28 | 9.2 | 680 |
| Example C15 | 2750000 | 50 | 27 | 10.0 | 670 |
| Example C16 | 1630000 | 49 | 25 | 8.9 | 510 |
| Example C17 | 1580000 | 52 | 36 | 8.3 | 480 |
| Example C18 | 2500000 | 52 | 45 | 9.8 | 540 |
| Example 19 | 2530000 | 52 | 48 | 10.1 | 680 |
| Example 20 | 2,490,000 | 52 | 50 | 10.1 | 700 | strength and elongation at break and ASTM D 624 B for tear propagation resistance. The viscosity was determined at a shear rate of 0.9 s-1.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Each constituent of the inventive compositions may be a single constituent or a mixture of a plurality of constituents of the relevant type.

What is claimed is:

1. An addition-crosslinkable silicone LSR composition comprising
    (A) 100 parts by weight of vinyl-terminated polydiorganosiloxane having a viscosity of from 5000 to 700,000 mPas and having not more than 0.1 mol % of lateral vinyl groups,
    (B) from 0.1 to 50 parts by weight of polydiorganosiloxane having a viscosity of from 200 to 1,000,000 mPas and having from 0.5 to 30 mol % of lateral vinyl groups,
    (C) from 1 to 150 parts by weight of polydiorganosiloxane having a viscosity of at least 2,000,000 mPas and having from no to a maximum of three lateral vinyl groups per polymer chain,
    (D) SiH-functional crosslinker,
    (E) hydrosilylation catalyst, and
    (F) 0-90 parts by weight of a filler having a specific surface area of at least 50 m²/g.

2. The addition-crosslinkable silicone composition of claim 1, wherein the polydiorganosiloxane (A) comprises 2 units of the formula (1) per molecule $[R_2R^1SiO_{1/2}]$ (1), and units of the formula (2)

$[R_2SiO_{2/2}]$ (2), and has a viscosity of from 5000 to 1,000,000 mPas, where
    the radicals R are identical or different monovalent, unsubstituted or halogen- or cyano-substituted, SiC-bonded $C_{1-18}$-hydrocarbon radicals which are free of aliphatic carbon-carbon multiple bonds, and
    the radicals $R^1$ are identical or different monovalent, unsubstituted or halogen- or cyano-substituted $C_{1-10}$ alkenyl groups which may be bound to silicon via a divalent organic group.

3. The addition-crosslinkable silicone composition of claim 2, wherein the vinyl-containing polydiorganosiloxane (B) preferably comprises units of the formula (2),
    from 0.5 to 30 mol % of units of the general formula (4)

$[RR^1SiO_{2/2}]$ (4), and 0, 1 or 2 units of the formula (1) or 2, 1 or 0 units of the formula (5) per molecule $[R_3SiO_{1/2}]$ (5), and has a viscosity of from 200 to 1,000,000 mPas.

4. The addition-crosslinkable silicone composition of claim 1, wherein the polydiorganosiloxane (C) comprises
    0, 1 or 2 units of the formula (1) or 2, 1 or 0 units of the formula (5) per molecule,
    units of the formula (2), and
    0, 1, 2 or 3 units of the formula (4) per molecule,
    and has a viscosity of at least 2,000,000 mPas.

5. The addition-crosslinkable silicone composition of claim 1, wherein the polydiorganosiloxane (C) has an Si-bonded OH content of not more than 100 ppm by weight.

6. The addition-crosslinkable silicone composition of claim 4, wherein the polydiorganosiloxane (C) has an Si-bonded OH content of not more than 100 ppm by weight.

7. The addition-crosslinkable silicone composition of claim 1, wherein the viscosity of the polydiorganosiloxane (B) is not more than 200% of the viscosity of the polydiorganosiloxane (A) and the viscosity of the polydiorganosiloxane (C) is at least 500% of the viscosity of the polydiorganosiloxane (A).

8. The addition-crosslinkable silicone composition of claim 1, wherein the SiH crosslinker (D) comprises units of the formula (6)

$H_aR^3{}_bSiO_{(4-a-b)/2}$ (6), where
    the radicals $R^3$ are each, independently of one another, a monovalent, unsubstituted or halogen-or cyano-substituted, SiC-bonded $C_1$-$C_{10}$ hydrocarbon radical which is free of aliphatic carbon-carbon multiple bonds,
    a is 0, 1, 2 or 3,
    b is 0, 1, 2 or 3 and
    the sum a+b is $\leq 3$,
    with the proviso that at least two silicon-bonded hydrogen atoms are present per molecule.

9. The addition-crosslinkable silicone composition of claim 1, wherein the hydrosilylation catalyst (E) comprises at least one metal or compound thereof, of a metal selected from the group consisting of platinum, rhodium, palladium, ruthenium and iridium.

10. The addition-crosslinkable silicone composition of claim 1, wherein the reinforcing filler (F) is selected from the group consisting of precipitated and pyrogenic silicas and carbon black.

11. The addition-crosslinkable silicone composition of claim 1, wherein from 0 to 70% by weight of one or more further constituents (G) selected from the group consisting of resin-like polyorganosiloxanes which are different from the polyorganosiloxanes (A), (B) and (C), dispersants, solvents, bonding agents, pigments, dyes, plasticizers, organic polymers, heat stabilizers, inhibitors, additives for inducing thixotropy, hollow bodies, expandable hollow bodies, and blowing agents, is present.

12. A process for preparing an addition-crosslinkable silicone composition of claim 1, comprising mixing the components (A), (B), (C) and (F).

13. A process for preparing addition-crosslinkable silicone compositions of claim 1, wherein a first component comprises the hydrosilylation catalyst (E) in addition to (A), (B), (C) and (F), and a second component comprises the SiH crosslinker (D) in addition to (A), (B), (C) and (F).

14. An addition-crosslinking RTV or LSR elastomer, comprising an addition-crosslinkable silicone compositions of claim 1.

15. A silicone elastomer prepared by addition-crosslinking of an addition-crosslinkable silicone composition of claim 1.

16. The silicone elastomer of claim 15, which is a pacifier or a seal.

17. The addition-crosslinkable silicone composition of claim 1, which cures to an elastomer with a Shore A hardness in the range of about 30 to about 52.

18. The LSR composition of claim 1, wherein the polyorganosiloxane (B) has a viscosity of from about 1000 mPas to about 50,000 mPas.

19. The LSR composition of claim 1, wherein the polyorganosiloxane (A) has a viscosity from about 9000 to about 600,000 mPas.

20. The LSR composition of claim 18, wherein the polyorganosiloxane (A) has a viscosity from about 9000 to about 600,000 mPas.

* * * * *

UNITED STATES PATENT AND TRADEMARK OFFICE
CERTIFICATE OF CORRECTION

PATENT NO. : 7,592,400 B2 Page 1 of 1
APPLICATION NO. : 11/429841
DATED : September 22, 2009
INVENTOR(S) : Christof Woerner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Twenty-first Day of September, 2010

David J. Kappos
*Director of the United States Patent and Trademark Office*